(12) United States Patent
Grotelueschen et al.

(10) Patent No.: US 10,499,561 B2
(45) Date of Patent: Dec. 10, 2019

(54) BOOM ADJUSTMENT SYSTEM AND METHOD

(71) Applicant: CNH Industrial America LLC, New Holland, PA (US)

(72) Inventors: Nathan Carl Grotelueschen, Spicer, MN (US); Todd Rasmussen, Benson, MN (US); Jon Ellingson, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/812,265

(22) Filed: Jul. 29, 2015

(65) Prior Publication Data

US 2017/0027103 A1 Feb. 2, 2017

(51) Int. Cl.
*A01M 7/00* (2006.01)
*A01C 23/00* (2006.01)
*A01C 23/04* (2006.01)

(52) U.S. Cl.
CPC .......... *A01C 23/008* (2013.01); *A01C 23/047* (2013.01); *A01M 7/0042* (2013.01); *A01M 7/0057* (2013.01)

(58) Field of Classification Search
CPC ... A01C 23/001; A01C 23/047; A01C 23/008; A01C 23/02–028; A01M 7/0042; A01M 7/0057; A01M 7/00–0096; B05B 13/005; B05B 12/08; B05B 15/65; B05B 1/20;
(Continued)

(56) References Cited

U.S. PATENT DOCUMENTS 4,199,896 A 4/1980 Lehman
4,427,154 A 1/1984 Mercil
(Continued)

FOREIGN PATENT DOCUMENTS

DE 8325556 12/1983
DE 3722861 3/1988
(Continued)

OTHER PUBLICATIONS

AGCO Coorporation, RoGator Specification Pamphlet, 2012, pp. 1-24.*

*Primary Examiner* — Christopher S Kim
*Assistant Examiner* — Juan C Barrera
(74) *Attorney, Agent, or Firm* — Rebecca L. Henkel; Richard K. DeMille (57) ABSTRACT

A system includes a boom. The boom includes a first section and a second section. The system includes a first actuator element configured to drive rotation of the first section, a second actuator element configured to drive rotation of the second section, and a locking element configured to block rotation of the first section and to block rotation of the second section while the locking element is in an activated position. Moreover, the system includes a sensor element disposed on the boom. The sensor element is configured to output a signal indicative of a first height between the first section and a field and a second height between the second section and the field. The first and second sections are configured to independently rotate based on the received signal to maintain a desired height between the field and each of the first section and the second section.

20 Claims, 5 Drawing Sheets

(58) Field of Classification Search
CPC .... B05B 1/205; A01B 63/00–32; A01G 25/09
USPC .......................................... 239/73, 146–176
See application file for complete search history.

(56) References Cited

U.S. PATENT DOCUMENTS

| | | | | |
|---|---|---|---|---|
| 5,348,226 | A * | 9/1994 | Heiniger | A01M 7/0057 239/1 |
| 5,507,435 | A | 4/1996 | Benest | |
| 5,630,547 | A * | 5/1997 | Klemenhagen | A01M 7/0057 239/161 |
| 6,010,079 | A | 1/2000 | Mayfield et al. | |
| 6,834,223 | B2 * | 12/2004 | Strelioff | A01M 7/0057 239/167 |
| 2006/0118654 | A1 * | 6/2006 | Shivak | A01C 23/008 239/166 |
| 2011/0153168 | A1 * | 6/2011 | Peterson | A01B 79/005 701/50 |
| 2011/0282554 | A1 * | 11/2011 | Keye | A01M 7/0057 701/49 |
| 2014/0074360 | A1 * | 3/2014 | Rosa | G05D 3/12 701/50 |

FOREIGN PATENT DOCUMENTS

| | | |
|---|---|---|
| EP | 2186405 | 5/2010 |
| EP | 2510784 | 10/2012 |
| RU | 2132131 | 6/1999 |
| WO | 2012146255 | 11/2012 |

* cited by examiner

BOOM ADJUSTMENT SYSTEM AND METHOD

BACKGROUND

The invention relates generally to agricultural implements and, more specifically, to an adjustment mechanism for a boom of an agricultural sprayer.

Certain agricultural operators may conduct spraying operations to apply agricultural product (e.g., fertilizer or crop protection agents) to agricultural fields. In some cases, operators may use agricultural sprayers with laterally extending booms to apply fertilizer as the agricultural sprayer moves through the agricultural field via nozzles on the boom. Typical agricultural sprayers have booms that are fixed relative to the agricultural sprayer during spraying operations. However, with such typical agricultural sprayers, changes in terrain or crop canopy height may result in undesirable overspray, drop dispersion, or droplet sizes due to a position of the booms relative to the soil surface and/or the crop canopy.

BRIEF DESCRIPTION

In one embodiment an agricultural sprayer system for an agricultural implement includes a center portion and a boom coupled to the center portion and extending laterally from the center portion. In certain embodiments, the boom includes a first section comprising a first end rotatably coupled to the center portion and a second end and a second section comprising a third end rotatably coupled to the second end of the first portion and a fourth end. The agricultural sprayer system also includes a first actuator element configured to drive rotation of the first section, a second actuator element configured to drive rotation of the second section, and a locking element configured to block rotation of the first section relative to the center portion and to block rotation of the second section relative to the first portion while the locking element is in an activated position. Moreover, the agricultural sprayer system includes a sensor element disposed on the boom. The sensor element is configured to output a signal indicative of a first height between the first section and a field and a second height between the second section and the field. In certain embodiments, the first and second sections are configured to independently rotate based on the received signal to maintain a desired height between the field and each of the first section and the second section as the agricultural implement travels through the field.

In another embodiment an agricultural implement includes a pair of booms extending on opposite lateral sides of a center support structure, each of the pair of booms having an inner section rotatably coupled to the center support structure via inner hinges and an outer section rotatably coupled to the inner section via outer hinges. The agricultural implement also includes one or more sensor elements coupled to the boom and configured to output a respective signal indicative of a distance between each of the inner and outer sections and a field. Furthermore, the agricultural implement includes a lock configured to lock the inner and outer sections at a lock position while the boom is in a lock state. The lock state is configured to block rotation relative to the center support. Additionally, the agricultural implement includes a controller configured to independently and continuously instruct an actuator to rotate the inner and outer sections about the respective inner and outer hinges to maintain a predetermined height between each of the inner and outer sections and the field while the boom is in an unlocked state.

In a further embodiment an electronic control system for an agricultural sprayer includes a controller comprising a memory operatively coupled to a processor. The processor is configured to receive, from a first sensor, a first signal indicative of a first height of a first section of a boom relative to an agricultural field. Additionally, the processor is configured to receive, from a second sensor, a second signal indicative of an upcoming terrain feature of the agricultural field. Moreover, the processor is configured to determine a desired adjustment of the first section based on the first signal, the second signal, and a set height. The set height is a desired height relative to the agricultural field. Also, the processor is configured to transition the first section from the first height to the set height via an actuator element.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to a system and method for adjusting sections of a boom of an agricultural sprayer. In particular, a system and method for raising and lowering sections of the boom to account for changes in terrain (e.g., changes in soil surface contours and/or changes in crop canopy height) is disclosed. As used herein, terrain may refer to elevation changes, slope of the soil surface, features present on the soil surface (e.g., rocks, crops), changes in crop canopy height, or the like. In certain embodiments, the agricultural sprayer includes the boom coupled to and extending laterally from a center portion. The boom includes sections coupled together at respective ends via hinges and actuators. The sections are configured to pivot and/or rotate relative to one another about coupling points (e.g., at the hinges) in response to movement of the actuators. For example, each actuator may be a hydraulic cylinder that retracts a piston rod to raise one section relative to another section. Similarly, the hydraulic cylinder may extend the piston rod to lower the one section of the boom relative to another section. In this manner, different sections of the boom may be adjusted and maintained at different distances (e.g., heights) relative to a surface of an agricultural field. By adjusting the height of the boom sections, a substantially constant height between the boom and the surface and/or crop canopy may be maintained when terrain features (e.g., soil contours, crop canopy heights, or the like) change as the sprayer moves through the agricultural field. In certain embodiments, the boom may include sensor elements disposed along a length of the boom. For example, a sensor element may be placed at each hinge or connection between sections of the boom. The sensor element is configured to detect a height between the boom and the soil surface or crop canopy of the agricultural field. In certain embodiments, the system includes a controller configured to adjust the boom sections in response to the height detected by the sensor elements.

Furthermore, the agricultural sprayer also includes a spray bar extending along the length of the boom. The spray bar is configured to transport agricultural material (e.g., fertilizer, crop protection agents, chemicals) to nozzles for application to the agricultural field. For instance, the nozzles may be configured to atomize a liquid fertilizer for application to the agricultural field. While the disclosed embodiments refer to an agricultural field, in other embodiments the spray bar may be applying agricultural material to public green areas, golf courses, parks, or the like. Fertilizer application may be conducted in a variety of ways. For example, the agricultural sprayer may be driven through the agricultural field and fertilizer may be dispensed through nozzles disposed along laterally extending boom arms. The nozzles may be configured to provide suitable droplet size and spray diameter. For instance, in certain embodiments, multiple nozzles may be spaced apart along the boom such that there is overlap due to the spray patterns from the nozzles. Moreover, droplet size may be controlled by the nozzles (e.g., exit velocity, outlet diameter, product delivery system pressure, etc.) to reduce dispersion and improve application of the fertilizer to a target area.

However, agricultural fields are commonly graded or include terrain features that, without the disclosed embodiments, would cause the height between the boom and the agricultural field and/or crop canopy to vary as the agricultural sprayer moves through the agricultural field. As a result, with typical agricultural sprayers, certain portions of the agricultural field may receive unsuitable amounts of fertilizer depending on the height of the boom above the agricultural field, and/or application of the fertilizer may be uneven across the agricultural field. By incorporating the disclosed system and method that enables adjustment of individual boom sections, the height of the boom sections above the agricultural field may be controlled to improve the consistency with which fertilizer or crop protection agents are deposited on the field and to achieve suitable application of fertilizer or crop protection agents as the agricultural sprayer travels across the agricultural field.

Figure 1:
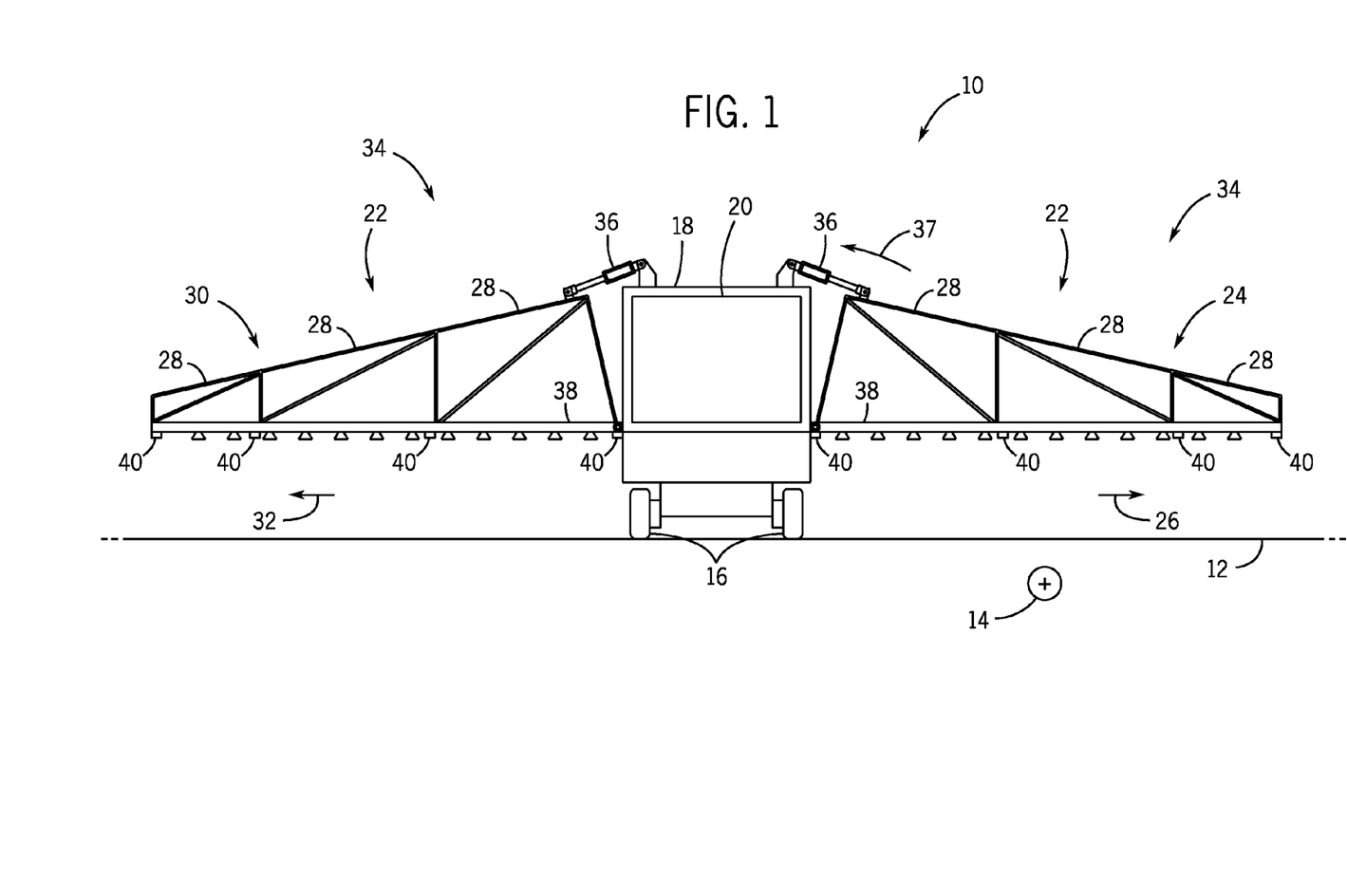
FIG. 1 is a rear view of an embodiment of an agricultural sprayer, including an adjustable boom.

Turning now to the drawings, and referring first to FIG. 1, a rear view of an embodiment of an agricultural sprayer 10 (e.g., sprayer) is illustrated in the form of a crop row sprayer. However, in certain embodiments, the present disclosure may be incorporated into floaters or the like. The sprayer 10 is configured to move through an agricultural field 12 in a direction of travel 14 (e.g., perpendicular to the plane of the page). The sprayer 10 includes wheels 16 which are used to guide the sprayer 10 through the agricultural field 12. It is appreciated that, while the depicted embodiment shows wheels 16, in certain embodiments the sprayer 10 may include tracks or the like. In the illustrated embodiment, the sprayer 10 includes a center portion 18 mounted above the wheels 16. The center portion 18 includes a cab 20 for an operator to control and/or monitor the progression of the sprayer 10 during the agricultural process (e.g., fertilizing).

In the illustrated embodiment, the sprayer 10 includes a boom 22 coupled to the center portion 18. The boom 22 includes a first boom portion 24 extending laterally outward from the center portion 18 in a lateral direction 26. The lateral direction 26 is substantially perpendicular to the direction of travel 14. As will be described in detail below, the first boom portion 24 includes multiple boom sections 28 that are configured to rotate relative to one another. A second boom portion 30 extends laterally outward from the center portion 18 in a lateral direction 32. The lateral direction 32 is substantially opposite the lateral direction 26 and is substantially perpendicular to the direction of travel 14. Moreover, as will be described below, the second boom portion 30 includes boom sections 28 configured to rotate relative to one another.

The first and second boom portions 24, 30 are configured to rotate relative to the center portion 18 from a transport position (e.g., a folded position) to an operation position 34 (e.g., an extended position). Moreover, in certain embodiments, the center portion 18 may include vertical pivots coupled to the first and second boom portions 24, 30 to enable folding alongside the center portion 18. In the illustrated embodiment, the boom portions 24, 30 are in the operation position 34 and are configured to distribute the agricultural product as the sprayer 10 travels through the agricultural field 12. A boom actuator 36 drives rotation of the boom portions 24, 30 between the transport position and the operation position 34. For example, in certain embodiments, the boom actuator 36 may be a hydraulic cylinder configured to retract a piston to move the first boom portion 24 in the direction 37 from the operation position 34 to the transport position. However, other types of actuators may be utilized to drive rotation of the boom portions 24, 30 between the transport position and the operation position. For example, pneumatic actuators, electric motors, or the like may be used as the boom actuators 36. In certain embodiments, the boom actuators 36 may be configured to operate independently. That is, movement of the first boom portion 24 may not be accompanied by movement of the second boom portion 30.

The sprayer 10 also includes a spray bar 38 extending along the boom 22. The spray bar 38 is configured to transport agricultural product (e.g., fertilizer) along the length of the boom 22 from storage containers mounted to the center portion 18 to nozzles coupled to the spray bar 38. As will be discussed, the spray bar 38 may be semi-rigid. That is, the spray bar 38 is configured to bend and/or deform as the boom sections 28 rotate relative to one another and/or relative to the center portion 18. However, in other embodiments, the spray bar 38 may be divided into sections manufactured to conform to different boom portions. The segments may be coupled by joints to enable movement of individual sections relative to adjacent sections.

In the illustrated embodiment, the sprayer 10 includes sensor elements 40 disposed along the boom 22. The sensor elements 40 are configured to measure a distance from the sensor element 40 (e.g., from a bottom of the boom 22) to the agricultural field 12 and/or the crop canopy (e.g., height above the agricultural field 12 and/or the crop canopy). As used herein, the agricultural field 12 and/or the crop canopy may be used interchangeably to describe a desired or setpoint height of the boom 22. In certain embodiments, the boom 22 may be adjusted relative to a surface of the agricultural field 12 (e.g., in embodiments where fertilizer is applied to a relatively flat field with little or no vegetation). However, in other embodiments, the boom 22 may be applying agricultural product to crops and/or vegetation growing from the agricultural field 12. As will be described in detail below, sensor elements 40 may be disposed at several locations along the boom 22. Moreover, the sensor elements 40 may be configured to send signals to a control system configured to control movement of the boom sections 28 relative to one another and/or relative to the center portion 18.

Figure 2:
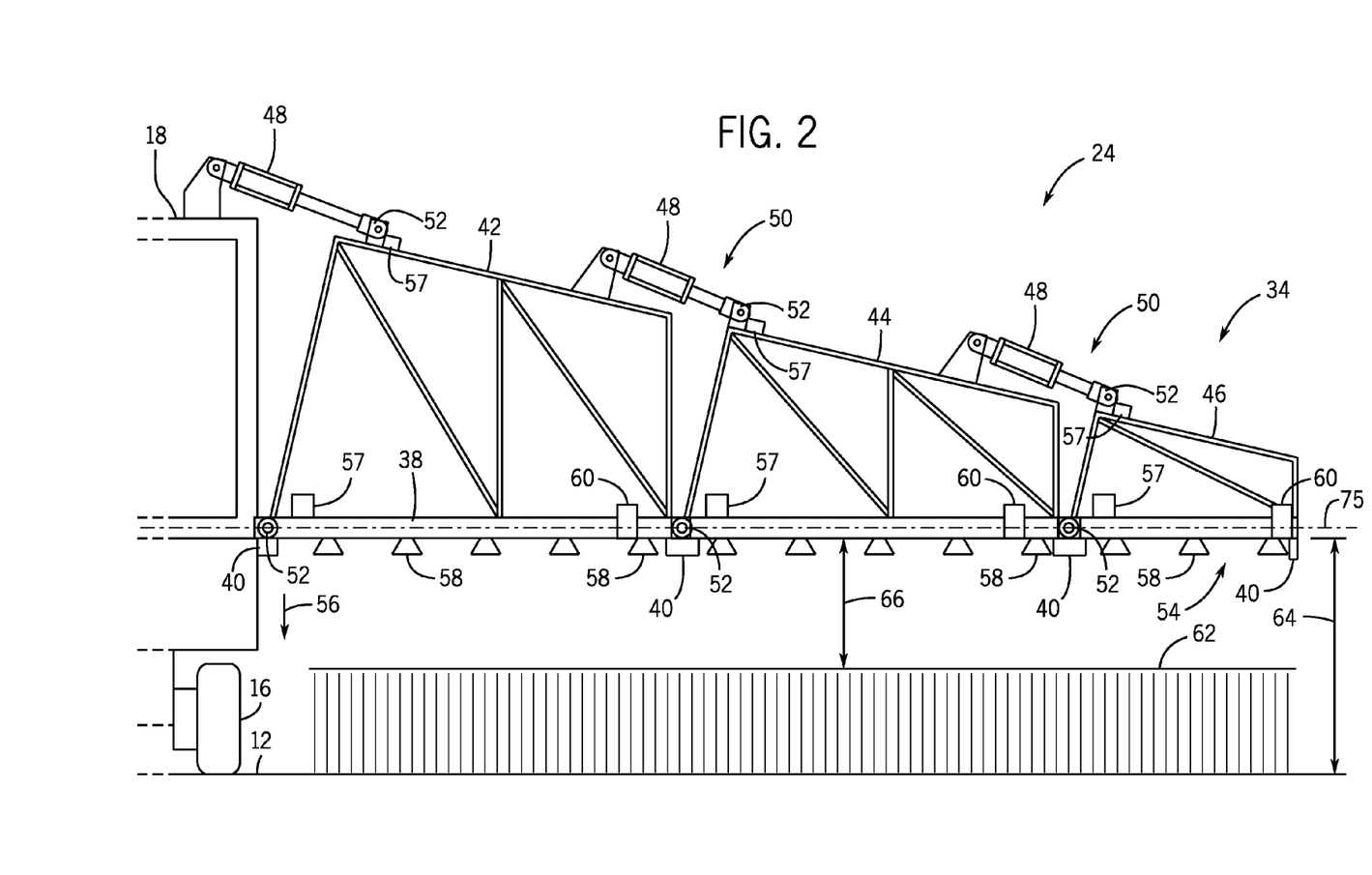
FIG. 2 is a rear view of a first boom portion of the agricultural sprayer of FIG. 1, in which the first boom portion is in an operation position.

FIG. 2 is a rear view of an embodiment of the first boom portion 24. For simplicity, operation of the sprayer 10 is described with the discussion limited to the first boom portion 24. However, it will be appreciated that the second boom portion 30 may be configured to operate in a similar manner with similar equipment. Moreover, as mentioned above, the first boom portion 24 and the second boom portion 30 are configured to operate independently of one another. As described above, the first boom portion 24 includes boom sections 28 configured to rotate relative to one another and/or relative to the center portion 18. For example, in the illustrated embodiment, the first boom portion 24 includes a first boom section 42, a second boom section 44, and a third boom section 46. However, it will be appreciated that the first boom portion 24 may include any suitable number of boom sections 28 (e.g., 1, 2, 3, 4, 5, 6, 7, 8, 9, 10, or more).

As mentioned above, the boom sections 28 are configured to move relative to one another and/or relative to the center portion 18. That is, rotation of the boom section 28 may adjust a height 64 of the boom section 28 relative to the agricultural field 12 to account for changes in terrain. In the illustrated embodiment, an actuator element 48 is configured to drive rotation of each boom section 28. As shown in FIG. 2, an actuator element 48 is disposed at each joint 50 (e.g., transition) between adjacent boom sections 28. For instance, an actuator element 48 is mounted at the transition between respective ends of the first boom section 42 and the second boom section 44. As a result, the actuator element 48 is configured to drive rotation of the second boom section 44 relative to the first boom section 42. In the illustrated embodiment, the actuator elements 48 are hydraulic cylinders, but it will be appreciated that different actuators may be used in other embodiments. For example, certain actuator elements 48 may be electric actuators, pneumatic cylinders, pulley systems, or the like.

The boom sections 28 also include rotation elements 52, in the illustrated embodiment. The rotation elements 52 are mounted at each joint 50 between adjacent boom sections 28. The rotation elements 52 are configured to enable rotation of the boom sections 28 in response to the actuator elements 46. For example, in certain embodiments, the rotation elements 52 are hinges coupled between the adjacent boom sections 28. However, in other embodiments, the rotation elements 52 may include flexible connection members (e.g., expansion joints), cross joints, additional actuators, or the like.

As shown, the sensor elements 40 are disposed along a bottom side 54 of the boom sections 28. The sensor elements 40 are configured to detect the height between the bottom side 54 of the boom sections 28 and the agricultural field 12 and/or the crop canopy. For example, the sensor elements 40 may be ultrasonic transducers that send sound waves toward the agricultural field 12 and receive the energy returned to the sensor element 40. While an ultrasonic transducer is illustrated, various other sensors including acoustic, infrared, capacitance, and the like may be utilized to determine the distance between the bottom side 54 of the boom sections 28 and the agricultural field 12. In the illustrated embodiment, the sensor elements 40 are located proximate to each joint 50 of the first boom portion 24. However, in other embodiments, more or fewer sensor elements 40 may be utilized, and/or the sensor elements 40 may be disposed at other suitable locations.

The sensor elements 40 may be configured to point generally downward in a vertical direction 56 to send energy toward the surface of the agricultural field 12. However, in other embodiments the sensor elements 40 may be angled relative to the soil surface to send energy forward of the first boom portion 24 (e.g., toward the direction of travel 14). For example, the sensor elements 40 may interrogate the upcoming terrain (e.g., forward of the first boom portion 24) in order to enable appropriate adjustments to the positions of the boom sections 28 in anticipation of the detected terrain. For instance, the sensor elements 40 may detect a hill or ridge at a distance in front of the sprayer 10. The sensor elements 40 may send a signal to the control system indicative of the upcoming terrain change, and the control system may send a signal to the actuator elements 46 to adjust the position of the boom sections 28 of the first boom portion 24. For example, the first boom portion 24 may be adjusted to maintain a substantially consistent distance between the bottom side 54 of the boom sections 28 and the agricultural field 12. As a result, the sensor elements 40 may enable appropriate movement of the boom sections 28 via the control system. Moreover, in certain embodiments, multiple sensor elements 40 may be positioned on the boom sections 28 at different angles. For instance, one sensor element 40 may point generally downward while a second sensor element 40 is angled relative to the soil surface to detect upcoming terrain changes. The two sensor elements 40 may both be utilized to position the boom section 28 at a desired height relative to the agricultural field 12.

Moreover, in certain embodiments, the sensor elements 40 may be configured to monitor a surrounding environmental condition. For example, the sensor elements 40 may include an anemometer for detecting wind speed. The sensor element 40 may determine the wind speed and send a signal to the control system indicative of the wind speed. As a result, the control system may adjust the height of the boom sections 28 to reduce dispersion of agricultural product due to the wind.

In the illustrated embodiment, the first boom portion 24 includes position sensors 57 located at each joint 50. However, in other embodiments, more or fewer position sensors 57 may be used to account for design conditions, and/or the position sensors 57 may be disposed at other suitable locations. The position sensors 57 are configured to detect the position of each boom section 28 relative to an adjacent boom section 28 and/or relative to the center portion 18. For example, in certain, embodiments the position sensor 57 may be a strain gauge that detects strain indicative of the deflection of the bottom side 54 of the boom 22 at the joint 50. In other embodiments, the position sensors 57 may be capacitive displacement sensors, Hall effect sensors, string potentiometers, or the like. The position sensors 57 are configured to send respective signals to the control system indicating the position of the boom sections 28. As will be described below, the position of each boom section 28 may be used by the control system to make continuous adjustments to the boom sections 28, which may maintain a relatively constant height of the boom 22 relative to the agricultural field 12.

In the illustrated embodiment, the first boom portion 24 includes the spray bar 38, as mentioned above. The spray bar 38 may be coupled to a tank configured to store agricultural product (e.g., fertilizer, fresh water, air, or the like) and is configured to direct the agricultural product toward nozzles 58 (e.g., outlets) mounted on the spray bar 38. As mentioned above, the nozzles 58 may be configured to distribute the agricultural product over the agricultural field 12. In some embodiments, the nozzles 58 are configured to emit the agricultural product at a desired spray angle with a desired droplet size to encourage overlap, decrease dispersion, and improve application of the agricultural product to a target area of the agricultural field. It will be appreciated that any suitable number of spray nozzles 58 may be included on the sprayer 10. For instance, longer booms 22 may utilize a greater number of nozzles 58 than smaller booms 22. In the illustrated embodiment, the spray bar 38 is equipped with flow controllers 60 along the length of the spray bar 38. In certain embodiments, the flow controllers 60 include pumps, restrictive orifices, valves, and the like to regulate the flow of agricultural product through the spray bar 38 to the nozzles 58. In certain cases, the flow controllers 60 may regulate flow based on positions of the boom sections 28 and/or in response to changes in positions of the boom sections 28. For instance, in cases where the third boom section 46 is higher, relative to the agricultural field 12, than the second boom section 44, the pump of the flow controller 60 may be utilized to increase the pressure of the agricultural product in the spray bar 38 upstream of the third boom section 46 to maintain a consistent pressure due to the changes in elevation and/or line losses due to the flexing of the spray bar 38. Moreover, other flow control devices (e.g., restrictive orifices, valves, and the like) may be controlled via the control system and/or the flow controller 60 to maintain exit velocity at the nozzles 58 and/or restrict flow through the spray bar 38. In some embodiments, each boom section 28 includes an individual flow controller 60 configured to enhance flow for that boom section 28.

As shown in the illustrated embodiment, the first boom portion 24 extends substantially orthogonally from the center portion 18, and thus, is substantially parallel to the agricultural field 12 and a crop canopy 62 while the first boom portion 24 is in the operation position 34 in a generally level field 12. That is, a first height 64 from the nozzles 58 and/or the bottom side 54 of the first boom portion 24 to the agricultural field 12 is approximately constant along the length of the first boom portion 24. Furthermore, a second height 66 from the nozzles 58 and/or the bottom side 54 of the first boom portion 24 to the crop canopy 62 is approximately constant along the length of the first boom portion 24. As used herein, the first height 64 and the second height 66 may be described interchangeably because modifications of the height of boom 22 relative to the agricultural field 12 will also modify the height of the boom 22 relative to the crop canopy 62.

Figure 3:
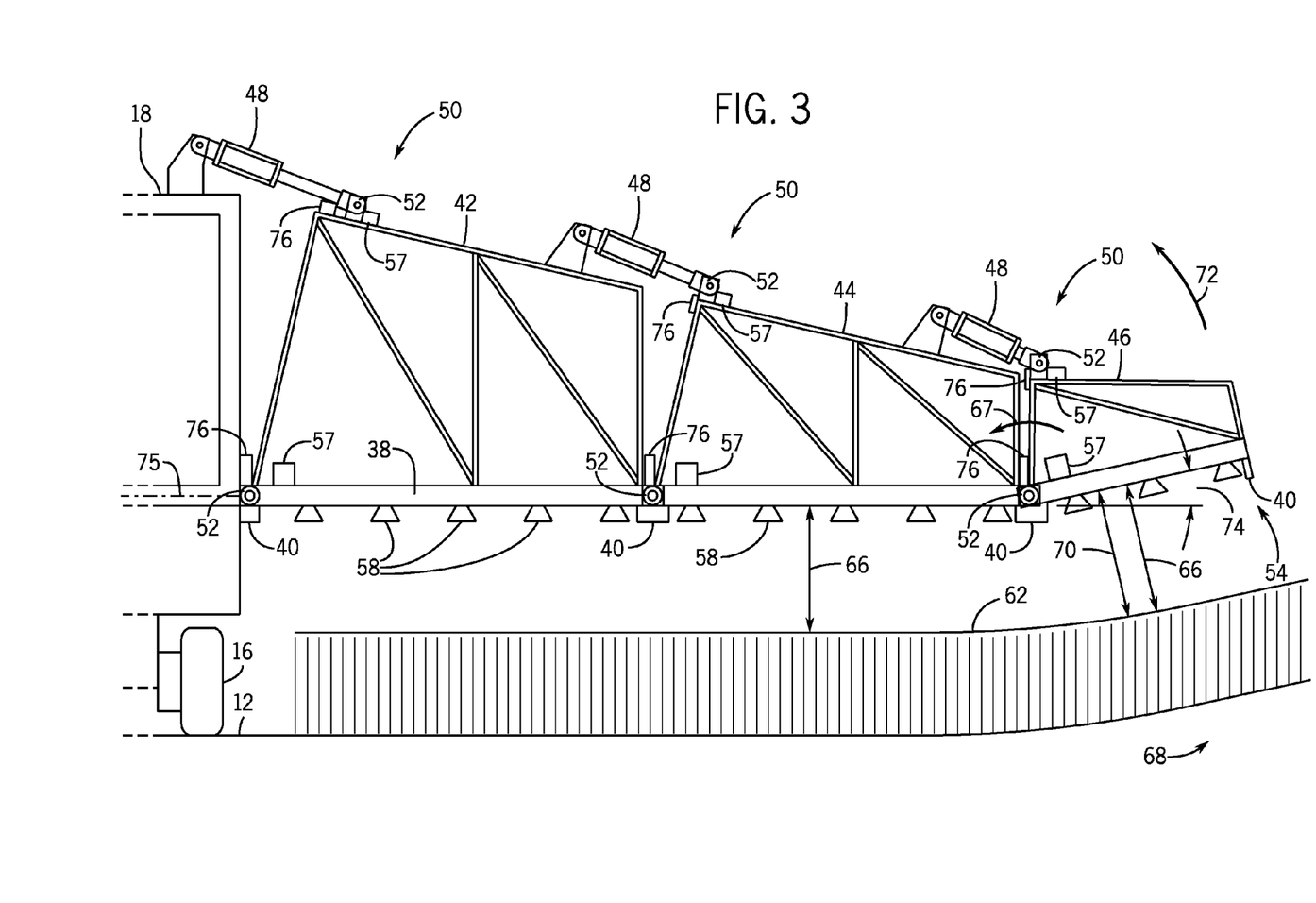
FIG. 3 is a rear view of the first boom portion of FIG. 2, in which a third boom section of the first boom portion is rotated relative to an adjacent second boom section.

FIG. 3 is a rear view of an embodiment of the first boom portion 24 in which the third boom section 46 is raised relative to the first boom section 42, the second boom section 44, and the center portion 18. As mentioned above, the actuator elements 48 are configured to rotate the boom sections 28 relative to one another and/or relative to the center portion 18 to maintain a desired height (e.g., set height) between each boom section 28 and the crop canopy 62 and/or the agricultural field 12. In the illustrated embodiment, the third boom section 46 is rotated relative to the second boom portion 44 via the actuator element 48 as shown by arrow 67 as the third boom section 46 moves over a terrain feature 68. As shown, the third boom section 46 is rotated until the second height 66 of the bottom side 54 of the third boom section 46 relative to the crop canopy 62 reaches the desired height and is substantially equal to the second height 66 of the bottom side 54 of the second boom section 44 relative to the crop canopy 62. As mentioned above, during spraying operations it is desirable to maintain a consistent distance 70 between the nozzles 58 and the crop canopy 62 for consistency in application of agricultural product to the agricultural field 12. By adjusting the height of the third boom section 46, the distance 70 between the crop canopy 62 and the nozzles 58 is maintained during spraying operations.

As noted above, in the illustrated embodiment, the sensor elements 40 are configured to detect the terrain feature 68 as the sprayer 10 moves through the agricultural field 12. The sensor elements 40 may send a signal to the control system, indicative of changes in the terrain, such as the detection of terrain feature 68 and/or an upcoming terrain feature 68. In embodiments where the actuator element 48 is a hydraulic cylinder, the control system may send a signal directing the actuator element 48 to retract a piston rod and rotate the third boom section 46 in the rotation direction 72 about the rotation element 52 located at the joint 50 connection between the second portion 44 to the third portion 46 based on receipt of the signal from the sensor elements 40. Accordingly, by rotating the third boom section 46, an angle 74 relative to a horizontal axis 75 (e.g., lateral axis) of the center portion 18 is increased such that the distance 70 between the nozzles 58 on the third boom section 46 and the crop canopy 62 above the terrain feature 68 is substantially the same as the distance 70 between the nozzles 58 on the second boom section 44 and the crop canopy 62 above the generally level field 12. After the terrain feature 68 is no longer present, the control system may instruct the piston rod of the actuator element 48 to extend to return the third boom section 46 to the operation position 34. That is, the angle 74 is substantially zero after the terrain feature 68 is passed to maintain the distance 70 between the third boom section 46 and the crop canopy 62.

In the illustrated embodiment, the first boom portion 24 includes locks 76. The locks 76 are configured to block rotational movement of the boom sections 28 via the actuator element 48. For example, in embodiments where the actuator element 48 is a hydraulic cylinder, the locks 76 may be valves that block the flow of hydraulic fluid into and/or out of the cylinder to block extension and retraction of the piston rod. In other embodiments, the locks 76 may comprise pins (e.g., spring loaded, hydraulically operated, electromechanically operated, etc.) that lock the rotation elements 52 in the operation position 34 (e.g., parallel to a substantially flat agricultural field 12). Each actuator element 48 and/or rotation element 52 may include one or more locks 76. The locks 76 may activate automatically (e.g., based on feedback from the control system and/or the sensor elements 40). For instance, the control system may detect that the signal from the sensor elements 40 is lost and/or erratic. As a result, the control system may send a signal to the locks 76 to activate the locks 76 and block movement of the boom sections 28 until the control system determines that reliable readings from the sensor elements 40 are received. In certain embodiments, the activation of the locks 76 may enable the control system to send an alert to the operator indicating one or more of the boom sections 28 are locked in the operation position 34. In some embodiments, the operator may manually activate and/or deactivate the locks 76 (e.g., manual insertion or removal of pins before operation begins). For example, the operator may lock the boom sections 28 in place during transportation or refueling operations.

Figure 4:
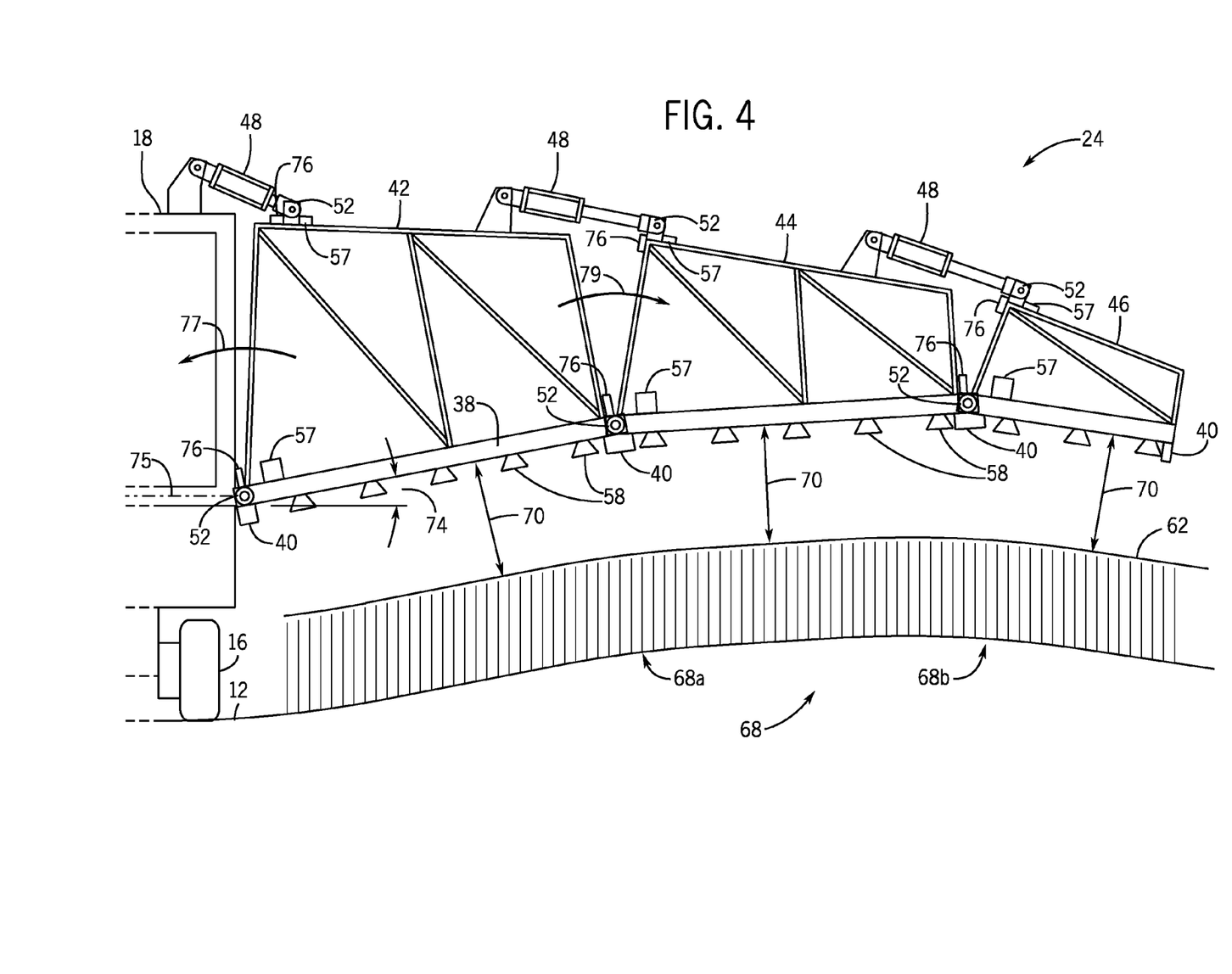
FIG. 4 is a rear view of the first boom portion of FIG. 2, in which a first boom section, a second boom section, and a third boom section are positioned to conform to an agricultural terrain feature.

FIG. 4 is a rear view of an embodiment of the sprayer 10 in which the boom section 28 of the first boom portion 24 are moved to conform to terrain features 68 of the agricultural field 12. As mentioned above, actuator elements 48 are configured to adjust the position of the boom sections 28 by driving rotation of the boom sections 28 relative to one another and/or relative to the center portion 18. In the illustrated embodiment, the sensor elements 40 receive information regarding terrain features 68 as the sprayer 10 moves through the agricultural field 12. As shown, the terrain features 68 may include both uphill and downhill sections extending along the length of the first boom portion 24. Without the disclosed embodiments, the second height 66 of the bottom side 54 relative to the crop canopy 62 would vary across the length of the first boom portion 24. In the illustrated embodiment, the sensor element 40 sends a signal to the control system upon detection of an uphill terrain feature 68a, and the control system drives rotation of the first boom section 42 relative to the center portion 18, as shown by arrow 77. As shown, the angle 74 between the first boom section 42 and the horizontal axis 75 is increased to account for the uphill terrain feature 68 and to maintain the distance 70 between the nozzles 58 of the first boom section 42 and the crop canopy 62.

In the illustrated embodiment, the uphill terrain feature 68a is accompanied by a downhill terrain feature 68b. As a result, the sensor elements 40 on the second boom section 44 may send a signal to the control system indicating the position of the crop canopy 62 relative to the nozzles 58 of the second boom section 44. The actuator element 48 may extend the piston, thereby driving rotation of the second boom section 44 about the rotation element 52 as shown by arrow 79. Accordingly, the distance 70 between the nozzles 58 of the boom section 24 is maintained across the length of the first boom portion 24.

As shown in FIG. 4, and mentioned above, the boom sections 28 are configured to rotate independently of adjacent boom sections 28. Accordingly, as shown, the first boom section 42 rotates upward (in a first direction as shown by arrow 77) while the second boom section 44 rotates downward (in a second direction, different from the first direction, as shown by arrow 79) to conform to the terrain feature 68. It will be appreciated that the control system may utilize the position sensors 57 when adjusting the boom sections 28. That is, the control system considers the position of adjacent boom sections 28 when making adjustments.

Figure 5:
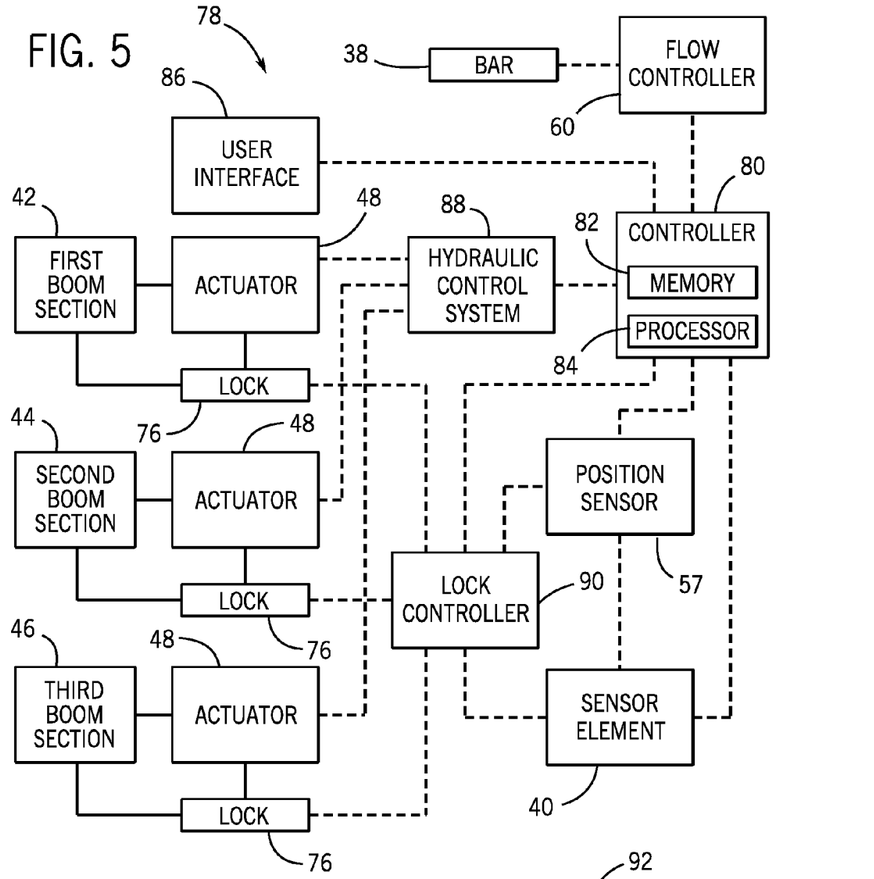
FIG. 5 is a block diagram of an embodiment of a control system for controlling the position of the adjustable boom of FIG. 1.

FIG. 5 is a diagram of an embodiment of a control system 78 configured to control the boom 22. In the illustrated embodiment, the control system 78 includes a controller 80 having a memory 82 and a processor 84, and a user interface 86. The memory 82 may be any type of non-transitory machine readable medium for storing data and executable instructions, such as random-access memory, read-only memory, rewritable flash memory, hard drives, optical discs, and the like. The processor 84 may execute instructions stored on the memory 82. For example, the memory 82 may contain machine readable code, such as instructions, that may be executed by the processor 84. In some embodiments, the memory 82 and processor 84 may enable automatic (e.g., processor/memory controlled) operation of the sprayer 10. As will be described below, the controller 80 is configured to adjust the height of the boom sections based on operator inputs, data from the sensor elements 40, pre-loaded design conditions (e.g., nozzle spacing, nozzle size, etc.), and the like.

The operator may interact with the user interface 86 to send an operation signal to the controller 80. For example, the operator may set the controller to an automatic mode configured to continuously or periodically adjust the position of the boom sections 28 as the sprayer 10 moves through the agricultural field 12. In certain embodiments, the operator may set the controller 80 to continuously or periodically adjust the boom sections 28 based on signals received from the sensor elements 40. Additionally, or alternatively, in certain embodiments, the operator may upload a terrain map indicating terrain features 68 in the agricultural field 12 and may set the controller 80 to adjust the boom sections 28 based on the terrain map. Furthermore, the operator may input a desired distance 70 between the nozzles 58 and the crop canopy 62 and/or the agricultural field 12 for the spraying operation. The user interface 86 may be positioned in the cab 20 or at a central control station remote from the sprayer 10. Moreover, in some embodiments, the user interface 86 includes a touch screen, knobs, buttons, and/or other input devices configured to enable the operator to interact with the user interface 86. In certain embodiments, the user interface 86 is configured to display operating conditions of the sprayer 10 such as fertilizer levels, speed, position of the boom 22, and the like.

In the illustrated embodiment, the control system 78 includes a hydraulic control system 88 communicatively coupled to the controller 80. As mentioned above, in the illustrated embodiment, the actuator elements 48 are hydraulic cylinders. The hydraulic control system 88 is configured to control the flow of hydraulic fluid to and from the actuator elements 48. For instance, the hydraulic control system 88 may include tanks, pumps, and valves configured to regulate the flow of hydraulic fluid to the actuator elements 48. In the illustrated embodiment, the hydraulic control system 88 regulates the position of the actuator elements 48, and thus the boom sections 28, based on a signal received from the controller 80.

The control system 78 includes a lock controller 90, in the illustrated embodiment. The lock controller 90 is configured to send a signal to the locks 76 to cause movement of the locks 76 between an active (e.g., locked) state and an inactive (e.g., unlocked) state. For instance, the default position of the locks 76 may be the inactive state, such that the boom sections 28 can be rotated via the actuator elements 48. However, upon receipt of the lock signal, the locks 76 may move to the active state, thus blocking rotation of the boom sections 28. While the illustrated embodiment has the locks 76 configured to lock the actuation elements 48, in other embodiments the locks 76 may be associated with other components. For example, as mentioned above, the locks 76 may be electronically controlled pins that lock the rotational elements 52 upon receipt of the lock signal from the lock controller 90. As shown, the locks 76 are individually controllable. That is, the lock 76 associated with the first boom section 42 may be in the locked position while the lock associated with the second boom section 44 may be in the unlocked position. As mentioned above, the lock controller 90 is communicatively coupled to the sensor elements 40 such that a signal from the sensor elements 40 may affect operation of the locks 76. Moreover, the lock controller 90 is communicatively coupled to the controller 80. For example, upon receipt of the lock signal the lock controller 90 may send a signal to the controller 80 and the controller 80 may instruct the actuator elements 48 to position the boom sections 28 in a position generally parallel to the horizontal axis 75. Once the boom sections 28 are generally parallel to the horizontal axis 75, the lock controller 90 may instruct the locks 76 to activate and enter the locked state.

As mentioned above, the sensor elements 40 are communicatively coupled to the controller 80. In the illustrated embodiment, the sensor elements 40 are ultrasonic transducers configured to send and receive acoustic energy to/from the agricultural field 12. As a result, the sensor elements 40 may act as a height sensor configured to determine the distance between the sensor element (e.g., the bottom side 54 of the boom 22) and the agricultural field 12 and/or the crop canopy 62. Moreover, as described above, the sensor elements 40 may act as an obstacle sensor in embodiments where the sensor elements 40 are angled in the direction of travel 14. For example, when the sensor elements 40 are angled, the energy emitted/received by the sensor elements 40 may be used to provide an indication of upcoming terrain features 68 and enable the controller 80 to adjust the position of the boom sections 28 in response to the upcoming terrain features 68. Furthermore, in certain embodiments, the sensor elements 40 may detect weather conditions (e.g., wind, humidity, etc.) to enable the controller 80 to make further adjustments to the position of the boom sections 28.

The control system 78 also incorporates the position sensors 57. In the illustrated embodiment, the position sensors 57 are communicatively coupled to the controller 80, to the sensor elements 40, and to the lock controller 90. For example, the position sensors 57 may send respective signals to the controller 80 indicating the current position of the boom sections 28 of the first boom portion 24. The signals received by the controller 80 may be used to determine whether additional changes should be made (e.g., via the hydraulic control system 88) to maintain a substantially constant distance 70 between the nozzles 58 and the crop canopy 62. Furthermore, the lock controller 90 may utilize information from the position sensors 57, such as waiting to lock the rotational elements 52 until the position sensor 57 indicates the boom sections 28 are in the operation position 34, for example.

As mentioned above, the control system 78 includes the flow controller 60. The flow controller 60 is configured to adjust flow control elements (e.g., pumps, valves, etc.) to maintain a desired flow rate and/or pressure to the nozzles 58 along the boom 22. For example, the flow controller 60 may send a signal to a pump to increase the pressure in the spray bar 38 when the flow controller 60 receives an indication from the controller 80 that a boom section 28 is in an elevated position relative to the horizontal axis 75 and/or relative to an adjacent boom section 28.

The control system 78 is configured to receive data from the sensor elements 40, position sensors 57, and the like and to adjust the position of the boom sections 28 of the boom 22 as the sprayer 10 travels through the agricultural field 12 based on the received data. In this manner, the controller 80 is configured to receive an input signal from the sensor elements 40 indicative of a height of the bottom side 54 (e.g., nozzles 58) of the boom 22 relative to the agricultural field 12 and/or relative to the crop canopy 62. Moreover, as mentioned above, the controller 80 may include software or programming configured to determine the height of the boom 22 relative to the agricultural field 12 based on the signals received from the sensor elements 40. Furthermore, the programming of the controller 80 may compare the determined height of each section with a desired height (e.g., input from the operator) and direct the hydraulic control system 88 to adjust the position of the boom sections 28. As mentioned above, the control system 78 may continuously or periodically monitor the position of the boom 22 and continuously or periodically change the position of the boom sections 28 to maintain a desired height relative to the agricultural field 12.

Figure 6:
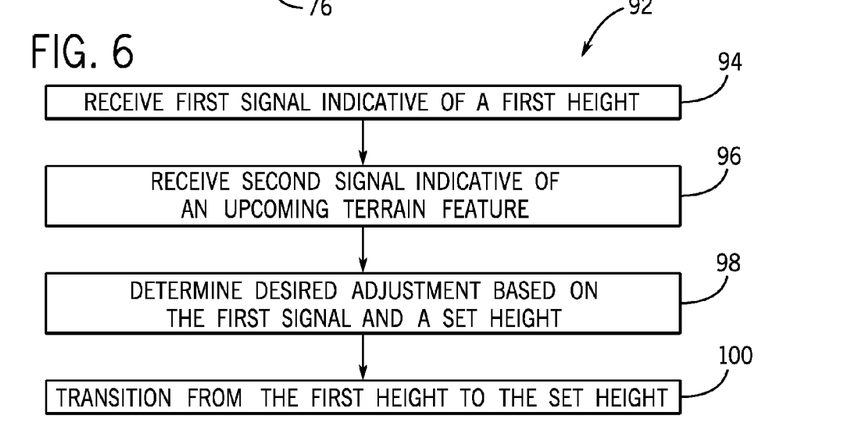
FIG. 6 is a flow chart of an embodiment of a method for adjusting the position of the adjustable boom of FIG. 1.

FIG. 6 is a flow chart of an embodiment of a controller controlled method 92 for adjusting the position of the boom 22. In the illustrated embodiment, the controller 80 receives a first signal indicative of a first height (e.g., first height 64, second height 66, distance 70, etc.) of a first section (e.g., boom sections 28) relative to an agricultural field 12 and/or relative to the crop canopy 62 at block 94. The controller 80 receives the first signal from the sensor element 40. For example, the sensor element 40 is configured to send a signal to the controller 80 indicative of the position of the bottom side 54 of the boom 22 relative to the agricultural field 12 and/or relative to the crop canopy 62. In certain embodiments, the controller 80 receives a second signal indicative of an upcoming terrain feature (e.g., terrain feature 68) of the agricultural field 12 at block 96. For example, sensor elements 40 may send a signal to the controller 80 indicative of an upcoming hill. In certain embodiments, the second signal may be indicative of a position of the first boom section. For example, the position sensor 57 may send a signal to the controller 80 indicative of a position of respective boom sections 28 relative to adjacent boom sections 28. In some embodiments, the controller 80 is configured to determine a desired adjustment of the first section based on the first signal and a set height at block 98. As described above, the set height may be input by the operator via the user interface 86. However, in alternative embodiments, the set height may be determined by the controller 80 based on characteristics of the spraying operation (e.g., type of agricultural product, type of crop, wind conditions, moisture conditions, or the like) and/or instructions stored on the memory 82. The controller 80 instructs the actuator element 48 to transition the first section from the first height to the set height at block 100. For example, the controller 80 may send a signal to the actuator element 48 to drive rotation of the first boom section 42 relative to the second boom section 44 such that the distance 70 between the nozzles 58 and the crop canopy 62 is substantially equal to the set height. For example, the controller 80 may determine a difference between the first height and the set height based on the signal received from the position sensor 57. As a result, the degree of rotation of the relative boom sections 28 may be changed due to the position of adjacent boom sections 28. As mentioned above, the controller 80 may continuously or periodically adjust the position of the boom 22 such that the boom sections 28 are substantially at the set height.

As described in detail above, the disclosed embodiments include a boom 22 of a sprayer 10 configured to adjust a vertical position of sections of the boom 22 relative to the agricultural field 12. In certain embodiments, the boom 22 includes boom sections 28 configured to rotate relative to one another via the actuator elements 48. The actuator elements 48 are configured to rotate the boom sections 28 upward (e.g., away from the agricultural field 12) and downward (e.g., toward the agricultural field 12). In this manner, the height of the boom sections 28 relative to the crop canopy 62 and/or relative to the agricultural field 12 may be adjusted to compensate for terrain features 68 such as hills, ridges, and the like. As described above, the control system 78 may receive a signal indicative of the height of the boom 22 relative to the agricultural field 12 from sensor elements 40 positioned along the boom 22. The controller 80 is configured to analyze the signal and output instructions to the actuator element 48 to continuously or periodically adjust the boom sections 28 to remain at approximately a set height above the crop canopy 62. As a result, application of the agricultural product to the field may remain consistent throughout the spraying process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural sprayer system for an agricultural implement, comprising:
   a center portion;
   a boom coupled to the center portion and extending laterally from the center portion, wherein the boom comprises:
     a first section comprising a first end rotatably coupled to the center portion and a second end; and
     a second section comprising a third end rotatably coupled to the second end of the first portion and a fourth end;
   a first actuator element configured to drive rotation of the first section;
   a second actuator element configured to drive rotation of the second section;
   a fluid control system comprising a fluid regulating valve configured to regulate a flow of fluid toward the first actuator element to adjust the first actuator element to drive rotation of the first section;
   a lock control system comprising a locking valve, wherein the locking valve is configured to block the flow of fluid toward the first actuator element to block rotation of the first section relative to the center portion while the locking valve is in an activated position; and
   a sensor element disposed on the boom, wherein the sensor element is configured to output a signal indicative of a first height between the first section and a field and a second height between the second section and the field, wherein the first and second sections are configured to independently rotate based on the signal to maintain a desired height between the field and each of the first section and the second section as the agricultural implement travels through the field, and the lock control system is configured to provide a control signal to the locking valve to transition the locking valve from a deactivated position to the activated position in response to determining that the signal is lost.

2. The agricultural sprayer system of claim 1, comprising a spray bar extending along the boom and configured to distribute agricultural product to nozzles disposed along the spray bar.

3. The agricultural sprayer system of claim 1, wherein the sensor element is an ultrasonic sensor, an infrared sensor, a sonar sensor, a capacitive sensor, or a combination thereof.

4. The agricultural sprayer system of claim 1, wherein the fluid control system comprises a hydraulic control system and the first actuator element comprises a hydraulic cylinder.

5. The agricultural sprayer system of claim 1, wherein the sensor element is configured to detect a terrain feature of the agricultural field forward of the boom.

6. The agricultural sprayer system of claim 1, wherein the agricultural sprayer system is configured to provide an alert to an operator when the locking valve is in the activated position.

7. An agricultural implement comprising:
   a pair of booms extending on opposite lateral sides of a center support structure, each of the pair of booms having an inner section rotatably coupled to the center support structure via an inner hinge and an outer section rotatably coupled to the inner section via an outer hinge;
   one or more sensor elements coupled to the boom and configured to output a respective signal indicative of a distance between each of the inner and outer sections and a field;
   a controller configured to independently instruct multiple actuators to drive rotation of each of the inner and outer sections about the respective inner and outer hinges based on the respective signal to maintain a predetermined height between each of the inner and outer sections and the field as the agricultural implement travels across the field;
   a lock system comprising at least one mechanical lock configured to move between a locked position in which the at least one mechanical lock engages a component of the agricultural implement to mechanically lock a respective inner hinge or a respective outer hinge to block rotation of a respective inner section or a respective outer section and an unlocked position in which the at least one mechanical lock enables a respective actuator of the multiple actuators to drive rotation of the respective inner section or the respective outer section; and
   one or more position sensors configured to output a respective position signal indicative of a respective position of the respective inner section or the respective outer section relative to the center support structure, wherein the lock system comprises a lock controller that is configured to provide a control signal to the at least one mechanical lock to transition the at least one mechanical lock from the unlocked position to the locked position based at least in part on the respective position signal.

8. The agricultural implement of claim 7, wherein the one or more sensor elements are disposed at each inner and outer hinge.

9. The agricultural implement of claim 7, wherein the actuator comprises a hydraulic cylinder, an electronic actuator, a pneumatic cylinder, or a combination thereof.

10. The agricultural implement of claim 7, wherein the predetermined height is configured to be set by an operator via a user interface.

11. The agricultural implement of claim 7, wherein the at least one mechanical lock comprises a pin and the component comprises the respective inner hinge, the respective outer hinge, the respective inner section, or the respective outer section.

12. The agricultural implement of claim 7, wherein the lock controller is configured to provide the control signal to the at least one mechanical lock only after the respective position signal indicates that the respective inner section or the respective outer section has reached an operation position in which the respective inner section or the respective outer section is generally parallel to a lateral axis of the agricultural implement.

13. The agricultural implement of claim 7, wherein the at least one mechanical lock comprises an electromechanically operated pin such that the control signal generates mechanical movement of the pin.

14. An electronic control system for an agricultural sprayer, comprising:
 a controller comprising a memory operatively coupled to a processor, wherein the processor is configured to:
  receive, from a first sensor, a first signal indicative of a first height of a first section of a boom relative to an agricultural field;
  receive, from a second sensor, a second signal indicative of an upcoming terrain feature of the agricultural field;
  determine a desired adjustment of the first section based on the first signal, the second signal, and a set height, wherein the set height is a desired height relative to the agricultural field;
  instruct an actuator to rotate the first section relative to a center portion of the agricultural sprayer to transition the first section from the first height to the set height; and
  provide a control signal to a flow control element to adjust a flow of an agricultural product to nozzles positioned along the first section of the boom based on a degree of rotation of the first section relative to the center portion of the agricultural sprayer.

15. The electronic control system of claim 14, wherein the controller is configured to instruct the actuator to continuously adjust the first section based on the second signal as the agricultural sprayer travels across the agricultural field.

16. The electronic control system of claim 14, wherein the actuator comprises a hydraulic cylinder, an electronic actuator, a pneumatic cylinder, or a combination thereof.

17. The electronic control system of claim 14, comprising a lock element, wherein the first section is blocked from rotational movement while the lock element is in a lock position.

18. The electronic control system of claim 14, wherein the flow control element comprises a pump.

19. The electronic control system of claim 14, wherein the processor is configured to provide the control signal to the flow control element to maintain a consistent pressure at each nozzle along the boom.

20. The electronic control system of claim 14, wherein the processor is configured to:
 receive, from another sensor, a respective sensor signal indicative of a second height of a second section of the boom relative to the agricultural field;
 determine a respective desired adjustment of the second section based on the respective sensor signal, the second signal, and the set height;
 instruct a respective actuator to rotate the second section relative to the center portion of the agricultural sprayer to transition the second section from the second height to the set height; and
 provide a respective control signal to a respective flow control element to adjust a respective flow of the agricultural product to respective nozzles positioned along the second section of the boom based on a respective degree of rotation of the second section relative to the center portion of the agricultural sprayer.

* * * * *